US007409897B2

(12) United States Patent
Adams

(10) Patent No.: US 7,409,897 B2
(45) Date of Patent: Aug. 12, 2008

(54) CABLE STRIPPER APPARATUS

(76) Inventor: Allan R. Adams, 308 Olsen Ct., Stoughton, WI (US) 53589

( * ) Notice: Subject to any disclaimer, the term of this patent is extended or adjusted under 35 U.S.C. 154(b) by 289 days.

(21) Appl. No.: 11/255,423

(22) Filed: Oct. 22, 2005

(65) Prior Publication Data

US 2006/0099848 A1 May 11, 2006

Related U.S. Application Data

(60) Provisional application No. 60/622,576, filed on Oct. 27, 2004, provisional application No. 60/622,330, filed on Oct. 26, 2004.

(51) Int. Cl.
*B26D 1/02* (2006.01)
*H02G 1/12* (2006.01)

(52) U.S. Cl. .......................... 83/431; 83/436.3; 83/870; 83/874; 83/950; 29/426.4

(58) Field of Classification Search .................. 83/861, 83/426, 431, 947, 881, 886, 997, 924, 870, 83/941, 950, 446, 447, 874, 857, 436.3; 29/825, 29/861, 564, 426.4, 426.5, 426.6, 762; 81/9.4, 81/9.44, 9.51; 30/90.4, 91.1
See application file for complete search history.

(56) References Cited

U.S. PATENT DOCUMENTS

| | | | | |
|---|---|---|---|---|
| 1,974,194 | A * | 9/1934 | Phillips | 241/101.1 |
| 3,175,430 | A * | 3/1965 | Smith et al. | 81/9.51 |
| 3,575,329 | A * | 4/1971 | Hannabery | 225/97 |
| 4,103,578 | A * | 8/1978 | Ducret | 83/409 |
| 4,169,400 | A * | 10/1979 | Ducret | 83/409 |
| 5,542,327 | A * | 8/1996 | Schultz | 83/861 |
| 6,694,853 | B2 * | 2/2004 | Adams | 83/870 |
| 2003/0015080 | A1 * | 1/2003 | Adams | 83/874 |

* cited by examiner

*Primary Examiner*—Ghassem Alie
(74) *Attorney, Agent, or Firm*—David J. Archer

(57) ABSTRACT

A cable stripper apparatus is disclosed for stripping insulation from an electric cable. The apparatus includes a framework and a driven wire feeder rotatably secured to the framework. A guide is provided for guiding the cable towards the wire feeder. The guide includes a movable spacer bar which extends towards the wire feeder. A cutter has a cutting edge which is disposed spaced and parallel to an axis of rotation of the wire feeder. The cutter is connected to the framework immediately adjacent to the wire feeder. The arrangement is such that when the cable is guided by the guide towards the wire feeder, the wire feeder, spacer bar and the cutter cooperate with each other for stripping the insulation from the cable. A cam is rotatably supported by the framework for moving the movable spacer bar relative to the framework to a required location of a plurality of locations of the movable spacer bar. The cam defines a plurality of cam faces such that when the cam is selectively rotated, a corresponding cam face of the plurality of cam faces cooperates with and moves the spacer bar to the required location of the spacer bar for guiding a particular gauge wire towards the cutter.

17 Claims, 7 Drawing Sheets

CABLE STRIPPER APPARATUS

CROSS REFERENCE TO RELATED APPLICATIONS

The present invention is a Complete application to Provisional application U.S. Ser. No. 60/622,330 filed Oct. 26, 2004 and Provisional application U.S. Ser. No. 60/622,576 filed Oct. 27, 2004. All of the disclosure of the aforementioned Provisional applications are incorporated herein by reference.

BACKGROUND OF THE INVENTION

1. Field of the Invention

The present invention relates to a cable stripper apparatus for stripping insulation from an electric cable.

More specifically, the present invention relates to a cable stripper apparatus having a wire feeder and a cutter for stripping insulation from an electric cable.

2. Background Information

When a house, office or factory is rewired, enormous quantities of scrap electrical cable are generated. In the past, in an attempt to recover the valuable metal such as copper from the used cable, such scrap cable was burnt so as to remove the plastic insulation therefrom. However, with the advent and implementation of rigorous Environmental Protection Agency (EPA) and Department of Natural Resources regulations prohibiting burning of waste plastics on electrical cables, the recovery of such valuable metal has been challenging. Primarily, the EPA and Department of Natural Resources regulations introduced approximately 15 years ago were introduced in order to prevent the release into the atmosphere of harmful gases given off during burning of plastics materials such as wire insulation.

More specifically, the approximate value of stripped copper wire is 50 cents per lb. However, the value of unstripped copper wire is only approximately 16 cents per lb. The cable stripping apparatus according to the present invention provides an extremely efficient means for rapidly removing insulation from electrical cables of various gauges.

Applicants prior application which was granted as U.S. Pat. No. 6,694,853 discloses a wire stripper apparatus which includes a spacer bar which can be exchanged for another spacer bar of a different thickness so that the machine can be adapted for stripping cables having different gauges or thicknesses. However, although the arrangement described in U.S. Pat. No. 6,694,853 operates very efficiently for stripping cable, the changing of the spacer bar has been found to be inconvenient and has made it necessary to stop the machine while such spacer bar is changed to accommodate the different type of cable being stripped. The present invention provides a unique way of enabling an operator to handle different gauge wires with minimal slow down in production.

Therefore, it is a primary feature of the present invention to provide a cable stripper apparatus for stripping insulation from an electric cable that overcomes the problems associated with the prior art arrangements.

Another feature of the present invention is the provision of a cable stripper apparatus for stripping insulation from an electric cable so that insulation can be stripped from different gauge wires.

Other features and advantages of the present invention will be readily apparent to those skilled in the art by a consideration of the detailed description of a preferred embodiment of the present invention contained herein.

SUMMARY OF THE INVENTION

A cable stripper apparatus is disclosed for stripping insulation from an electric cable. The apparatus includes a framework and a driven wire feeder rotatably secured to the framework. A guide is provided for guiding the cable towards the wire feeder. The guide includes a movable spacer bar which extends towards the wire feeder. A cutter has a cutting edge which is disposed spaced and parallel to an axis of rotation of the wire feeder. The cutter is connected to the framework immediately adjacent to the wire feeder. The arrangement is such that when the cable is guided by the guide towards the wire feeder, the wire feeder, spacer bar and the cutter cooperate with each other for stripping the insulation from the cable. A cam is rotatably supported by the framework for moving the movable spacer bar relative to the framework to a required location of a plurality of locations of the movable spacer bar. The cam defines a plurality of cam faces such that when the cam is selectively rotated, a corresponding cam face of the plurality of cam faces cooperates with and moves the spacer bar to the required location of the spacer bar for guiding a particular gauge wire towards the cutter.

In a more specific embodiment of the present invention the framework includes a first member of C-shaped cross sectional configuration, the first member having a first and a second end. The framework also includes a second member of C-shaped cross sectional configuration, the second member having a first and a second extremity. The first and second members are disposed spaced and parallel relative to each other.

Additionally, the first member further includes a first bearing which is disposed between the first and second end of the first member for rotatably supporting the wire feeder. A second bearing is disposed between the first and second extremity of the second member for rotatably supporting the wire feeder so that the wire feeder is rotatably disposed between the first and second bearings.

Also, a drive is provided, the drive including an electric motor and a transmission which is disposed between the motor and the wire feeder. The arrangement is such that when the motor is connected to a source of electrical power, the motor rotates the transmission for driving the wire feeder.

In an alternative embodiment of the present invention, the drive includes a manual drive so that when the manual drive is rotated, such rotation of the manual drive rotates the wire feeder. A gearbox is disposed between the manual drive and the wire feeder so that the gearbox transmits the rotation of the manual drive to the wire feeder.

The wire feeder includes a roller of cylindrical configuration, the roller defining a plurality of teeth for engaging the insulation.

More specifically, the plurality of teeth extend in a direction outwardly from an axis of rotation of the roller.

More particularly, the direction of the teeth is offset forwardly relative to a radial direction, the offset being forwardly relative to a rotational direction of the roller.

Furthermore, a drive shaft is disposed coaxially relative to the roller so that the drive shaft is rotatably supported by the framework, the drive shaft being drivingly connected to the drive.

The guide includes a base and the spacer bar is movable relative to the base. The spacer bar extends towards the wire feeder for guiding the electric cable towards the wire feeder.

Moreover, the cutter includes a blade which is disposed adjacent to the wire feeder. The blade is secured adjacent to the guide so that when the wire feeder is being rotated and the cable is guided by the guide towards the blade, the cable is fed between the wire feeder and the blade so that the blade strips the insulation from the cable.

The cam includes a handle for rotating the cam for selecting the required location of the spacer bar. Each cam face of the plurality of cam faces is of planar configuration and spaced circumferentially relative to an adjacent cam face. Also, each cam face is spaced relative to a rotational axis of the cam.

Also, each cam face is disposed at a different distance from the rotational axis of the cam.

A movable gate cooperates with the cam such that when the cam is selectively rotated, the movable gate rides on the cam faces so that the movable gate is correspondingly moved relative to the framework by the cam faces.

Additionally, a biasing device is disposed between the framework and the movable gate for urging the movable gate towards the cam as the movable gate rides on the cam faces.

A stud slidably extends through the framework, the stud having a first and a second end. The first end of the stud is secured to the movable gate and the second end of the stud is secured to the spacer bar. The arrangement is such that when the cam is selectively rotated, a corresponding cam face of the plurality of cam faces moves the movable gate and the stud for moving the spacer bar to the required location of the spacer bar for guiding a particular gauge wire towards the cutter.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

BRIEF DESCRIPTION OF THE DRAWINGS

Similar reference characters refer to similar parts throughout the various views and embodiments of the drawings.

DETAILED DESCRIPTION OF THE DRAWINGS

Figure 1:
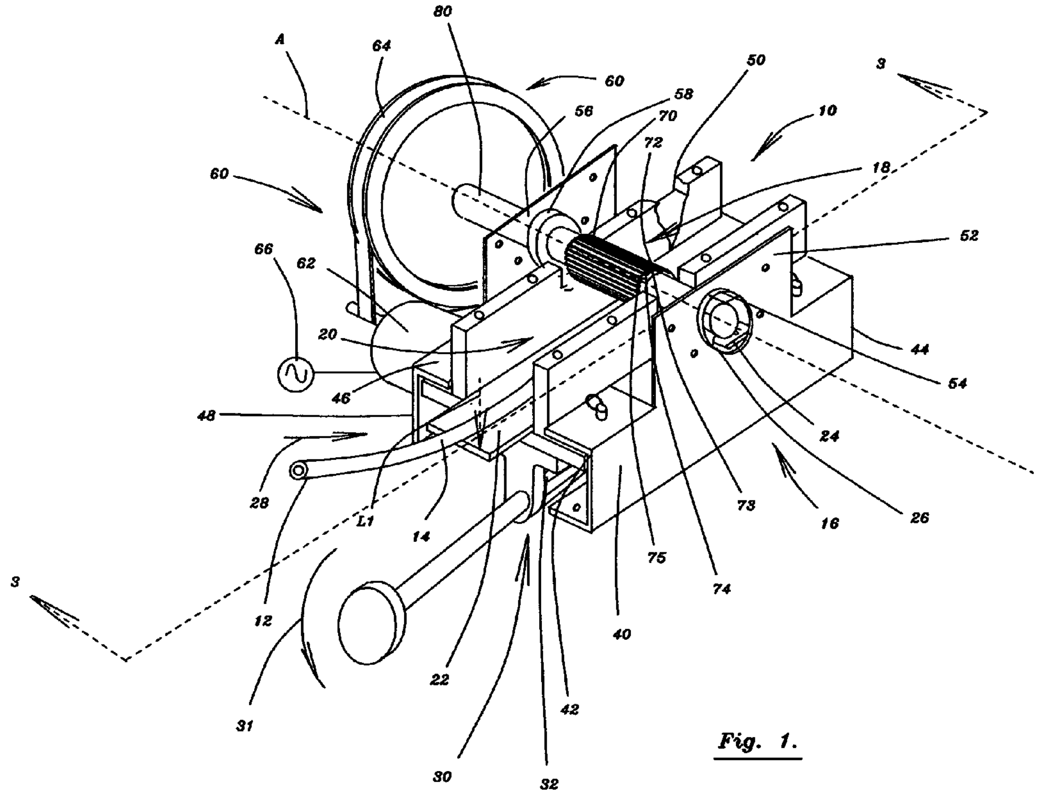
FIG. 1 is perspective view, partially broken away for clarity, of a cable stripper apparatus according to the present invention for stripping insulation from an electric cable.

FIG. 1 is perspective view partially broken away for clarity of a cable stripper apparatus generally designated 10 according to the present invention for stripping insulation 12 from an electric cable 14. As shown in FIG. 1, the apparatus 10 includes a framework generally designated 16 and a driven wire feeder generally designated 18 rotatably secured to the framework 16. A guide generally designated 20 is provided for guiding the cable 14 towards the wire feeder 18. The guide 20 includes a movable spacer bar 22 which extends towards the wire feeder 18. A cutter 24 has a cutting edge 26 which is disposed spaced and parallel to an axis of rotation A of the wire feeder 18. The cutter 24 is connected to the framework 16 immediately adjacent to the wire feeder 18. The arrangement is such that when the cable 14 is guided by the guide 20 towards the wire feeder 18 as indicated by the arrow 28, the wire feeder 18, spacer bar 22 and the cutter 24 cooperate with each other for stripping the insulation 12 from the cable 14. A cam generally designated 30 is rotatably supported by the framework 16 as indicated by the arrow 31 for moving the movable spacer bar 22 relative to the framework 16 to a required location as indicated by the location L1 of the spacer bar 22 shown in FIG. 1. The location L1 shown in FIG. 1 is one of a plurality of locations L1, L2, L3, L4, L5 and L6 of the movable spacer bar 22. The cam 30 defines a plurality of cam faces 32, 33, 34, 35, 36 and 37 to be described hereinafter such that when the cam 30 is selectively rotated as indicated by the arrow 31, a corresponding cam face such as cam face 32 of the plurality of cam faces 32-37 cooperates with and moves the spacer bar 22 to the required location L1 of the spacer bar 22 for guiding a particular gauge wire or cable 14 towards the cutter 24.

In a more specific embodiment of the present invention the framework 16 includes a first member 40 of C-shaped cross sectional configuration, the first member 40 having a first and a second end 42 and 44 respectively. The framework 16 also includes a second member 46 of C-shaped cross sectional configuration, the second member 46 having a first and a second extremity 48 and 50 respectively. The first and second members 40 and 46 are disposed spaced and parallel relative to each other.

Additionally, the first member 40 includes an upstanding extension 52 which supports a first bearing 54 which is disposed between the first and second end 42 and 44 respectively of the first member 40 for rotatably supporting the wire feeder 18. The second member 46 includes a further upstanding extension 56 which supports a second bearing 58 which is disposed between the first and second extremity 48 and 50 of the second member 46 for rotatably supporting the wire feeder 18 so that the wire feeder 18 is rotatably disposed between the first and second bearings 54 and 58 respectively.

Also, a drive generally designated 60 is provided, the drive 60 including an electric motor 62 and a transmission 64 which is disposed between the motor 62 and the wire feeder 18. The arrangement is such that when the motor 62 is connected to a source of electrical power 66, the motor 62 rotates the transmission 64 for driving the wire feeder 18.

Figure 2:
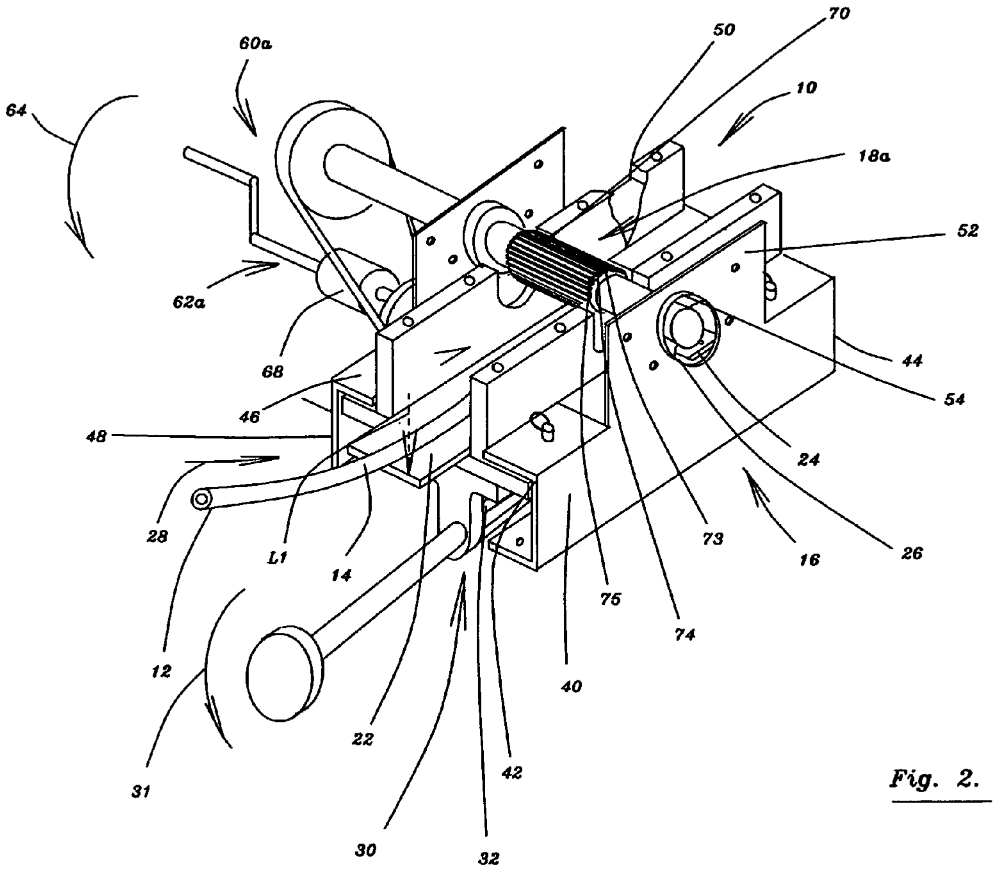
FIG. 2 is a perspective view of an alternative embodiment of the present invention.

FIG. 2 is a perspective view of an alternative embodiment of the present invention. As shown in FIG. 2, a drive generally designated 60*a* includes a manual drive 62*a* so that when the manual drive 62*a* is rotated as indicated by the arrow 64, such rotation of the manual drive 62*a* rotates a wire feeder 18*a*. A gearbox 68 is disposed between the manual drive 62*a* and the wire feeder 18*a* so that the gearbox 68 transmits the rotation of the manual drive 62*a* to the wire feeder 18*a*.

As shown in FIG. 1, the wire feeder 18 includes a roller 70 of cylindrical configuration, the roller 70 defining a plurality of teeth 72, 73, 74 and 75 for engaging the insulation 12.

Figure 3:
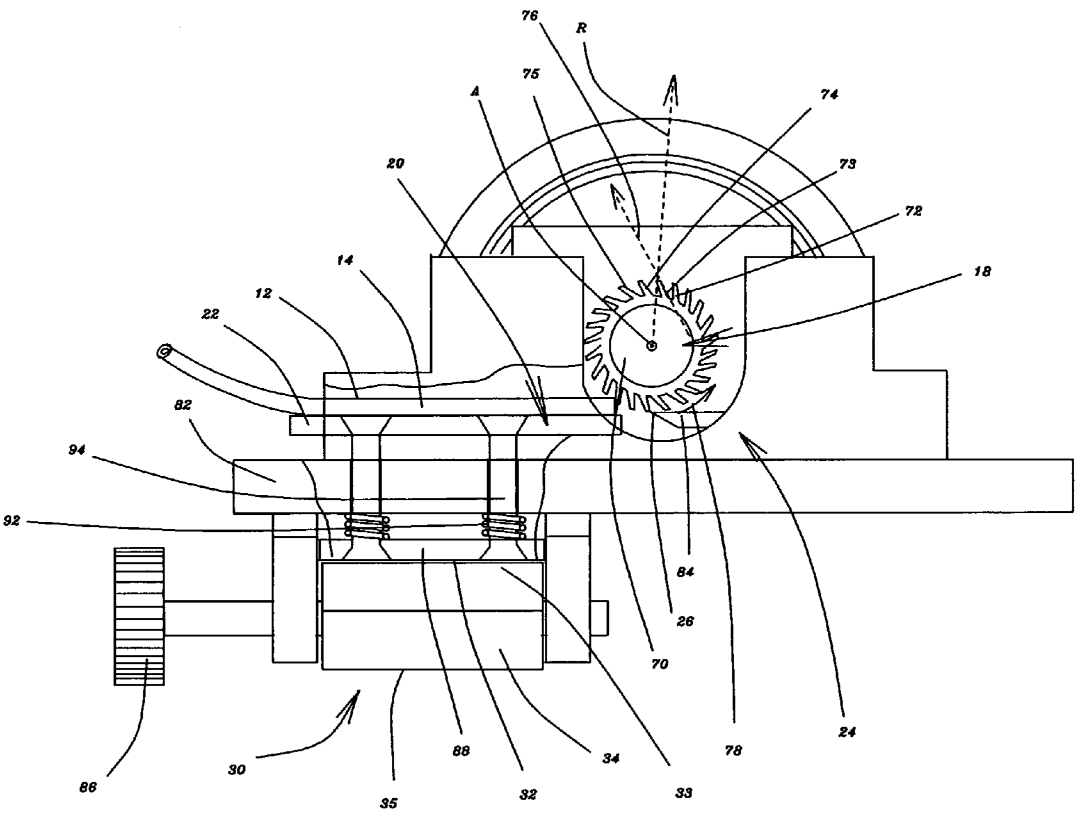
FIG. 3 is a view taken on the line 3-3 of FIG. 1.

FIG. 3 is a view taken on the line 3-3 of FIG. 1. As shown in FIG. 3, the plurality of teeth 72-75 extend in a direction 76 outwardly from the axis of rotation A of the roller 70.

More particularly, the direction 76 of the teeth 72-75 is offset forwardly relative to a radial direction R, the offset being forwardly relative to a rotational direction as indicated by arrow 78 of the roller 70.

As shown in FIG. 1, a drive shaft 80 is disposed coaxially relative to the roller 70 so that the drive shaft 80 is rotatably supported by the framework 16, the drive shaft 80 being drivingly connected to the drive 60.

Figure 4:
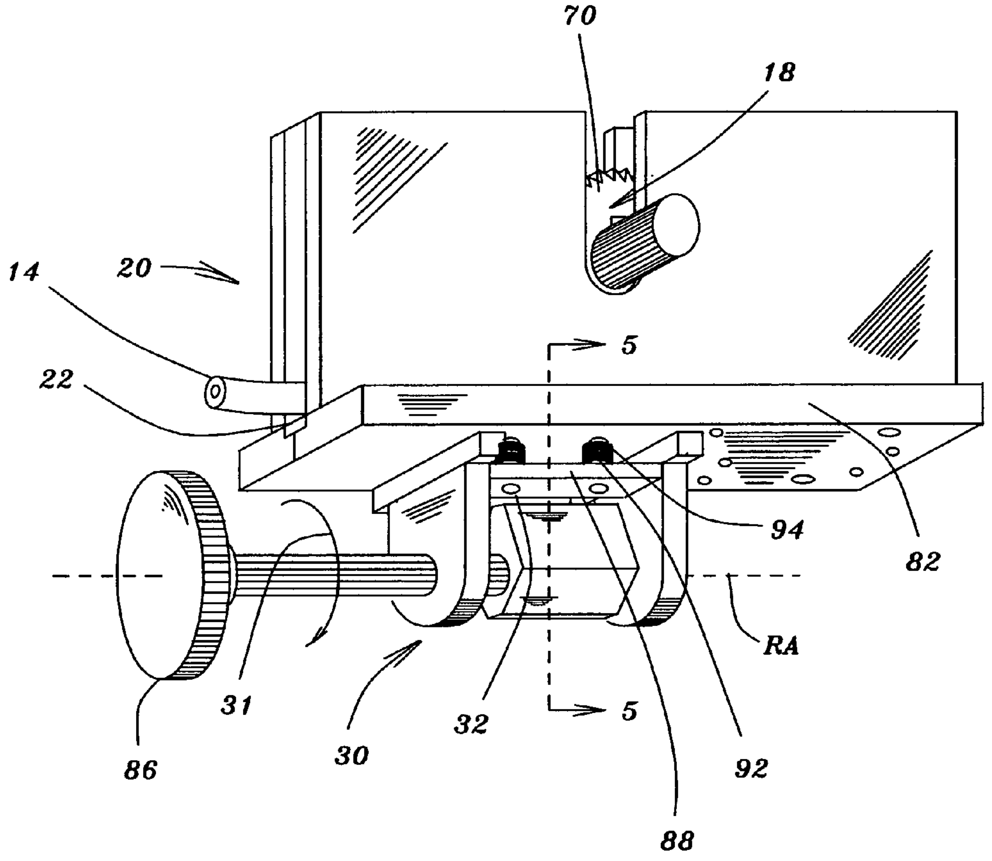
FIG. 4 is an enlarged perspective view of the guide shown in FIG. 1.

FIG. 4 is an enlarged perspective view of the guide 20 shown in FIG. 1. As shown in FIG. 4, the guide 20 includes a base 82 and the spacer bar 22 is movable relative to the base 82. The spacer bar 22 extends towards the wire feeder 18 for guiding the electric cable 14 towards the wire feeder 18.

As shown in FIG. 3, the cutter 24 includes a blade 84 which is disposed adjacent to the wire feeder 18. The blade 84 is secured adjacent to the guide 20 so that when the wire feeder 18 is being rotated and the cable 14 is guided by the guide 20 towards the blade 84, the cable 14 is fed between the wire feeder 18 and the blade 84 so that the blade 84 strips the insulation 12 from the cable 14.

As shown in FIG. 4, the cam 30 includes a handle 86 for rotating the cam 30 for selecting the required location such as location L1 of the spacer bar 22 as shown in FIG. 1. Each cam face such as face 32 of the plurality of cam faces 32-37 is of planar configuration and spaced circumferentially relative to adjacent cam faces 33 and 37. Also, each cam face such as cam face 32 is spaced relative to a rotational axis RA of the cam 30.

Figure 5:
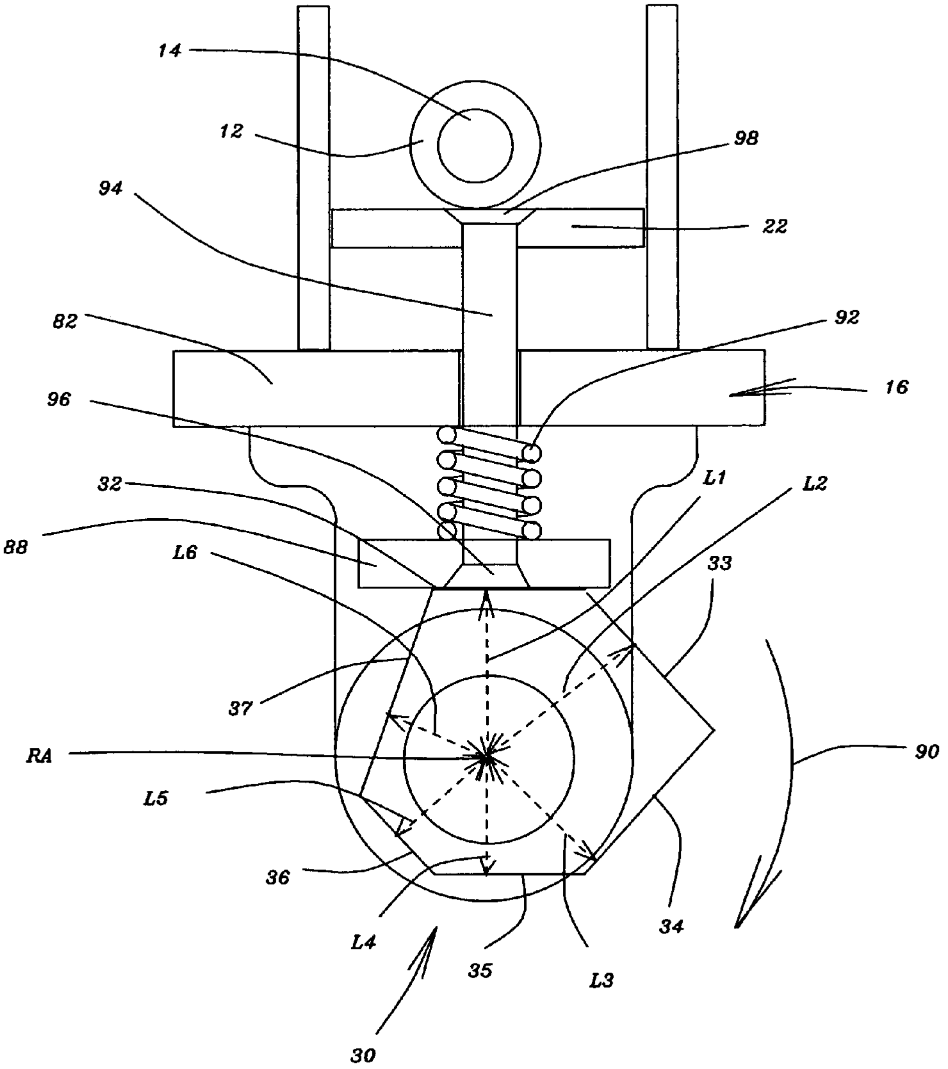
FIG. 5 is a sectional view taken on the line 5-5 of FIG. 4.

FIG. 5 is a sectional view taken on the line 5-5 of FIG. 4. As shown in FIG. 5, each cam face 32-37 is disposed at a different distance L1, L2, L3, L4, L5 and L6 respectively from the rotational axis RA of the cam 30.

As shown in FIG. 4, movable gate 88 cooperates with the cam 30 such that when the cam 30 is selectively rotated as indicated by the arrow 31, the movable gate 88 rides on the cam faces 32-37 so that the movable gate 88 is correspondingly moved relative to the framework 16 by the cam faces 32-37.

Additionally, a biasing device such as a compression spring 92 is disposed between the framework 16 and the movable gate 88 for urging the movable gate 88 towards the cam 30 as the movable gate 88 rides on the cam faces 32-37.

A stud 94 slidably extends through the framework 16.

Figure 6:
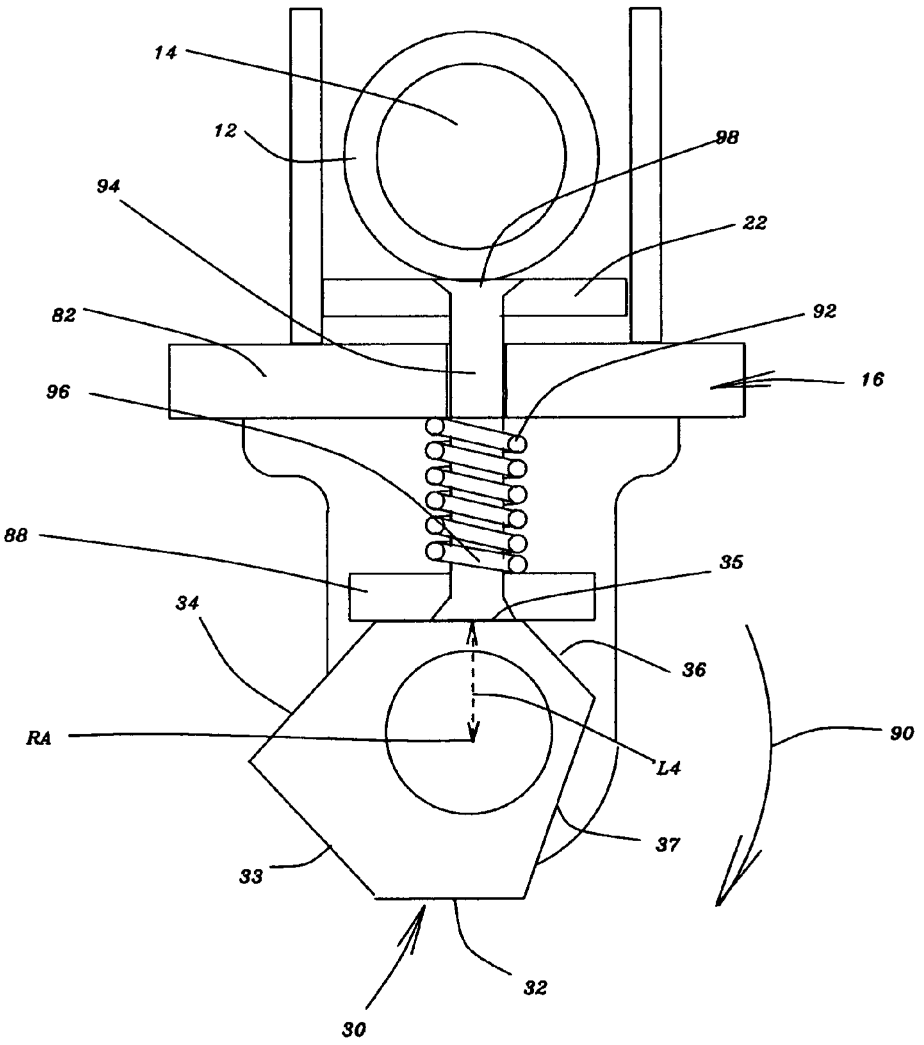
FIG. 6 is a similar view to that shown in FIG. 5 but shows the cam shown in FIG. 1 rotated through 180 degrees.

FIG. 6 is a similar view to that shown in FIG. 5 but shows the cam 30 rotated through 180 degrees so that the cam face 35 is selected and so that the distance from the rotational axis RA is changed from L1 shown in FIG. 5 to L4. Accordingly, the spring 92 urges the gate 88 against the cam face 35 and the stud 94 moves downwardly thereby moving the attached spacer bar 22 downwardly to accommodate a thicker cable 14 as shown.

Figure 7:
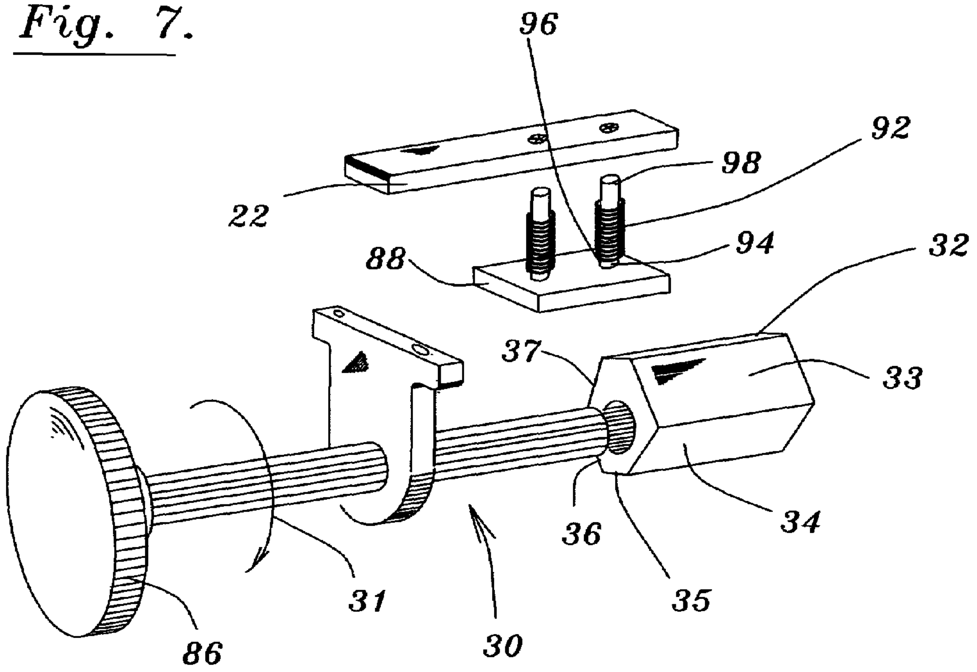
FIG. 7 is an exploded perspective view of the cam and the movable spacer bar shown in FIG. 1.

FIG. 7 is an exploded perspective view of the cam 30 and the movable spacer bar 22 shown in FIG. 1. As shown in FIG. 7, the stud 94 has a first and a second end 96 and 98 respectively. The first end 96 of the stud 94 is secured to the movable gate 88 and the second end 98 of the stud 94 is secured to the spacer bar 22. Also, as shown in FIG. 7 a further spaced stud similar to stud 94 is provided. The arrangement is such that when the cam 30 is selectively rotated as indicated by the arrow 31 shown in FIG. 4, a corresponding cam face such as cam face 32 of the plurality of cam faces 32-37 moves the movable gate 88 and the stud 94 for moving the spacer bar 22 to the required location such as location L1 of the spacer bar 22 for guiding a particular gauge wire or cable 14 towards the cutter 24.

In operation of the apparatus according to the present invention, an operator places the cable 14 to be stripped in the guide 20 with the wire feeder 18 turning so that the cable is guided between the wire feeder 18 and the cutter 24. The arrangement is such that the cutting edge 26 of the cutter 24 strips the insulation 12 from the cable 14. Additionally, if the operator needs to strip a wire having a different gauge, the operator will rotate the handle 86 and will select a cam face of the faces 32-37 so that the movable spacer bar 22 is moved to the corresponding location L1-L6 according to the type of cable being stripped. Although the present invention has been described with a cam having six faces, it will be understood by those skilled in the art that any number of faces can be provided to accommodate various cable gauges.

The present invention provides a unique apparatus for efficiently removing and stripping insulation from electric cables of different gauges and thicknesses.

What is claimed is:

1. A cable stripper apparatus for stripping insulation from an electric cable, said apparatus comprising:

a framework;

a driven wire feeder rotatably secured to said framework;

a guide for guiding the cable towards said wire feeder;

said guide including:

a movable spacer bar extending towards said wire feeder;

a cutter having a cutting edge disposed spaced and parallel to an axis of rotation of said wire feeder, said cutter being connected to said framework immediately adjacent to said wire feeder, the arrangement being such that when the cable is guided by said guide towards said wire feeder, said wire feeder, spacer bar and said cutter cooperate with each other for stripping the insulation from the cable;

a cam rotatably supported by said framework for moving said movable spacer bar relative to said framework to a required location of a plurality of locations of said movable spacer bar, said cam defining a plurality of cam faces such that when said cam is selectively rotated, a corresponding cam face of said plurality of cam faces cooperates with and moves said spacer bar to said required location of said spacer bar for guiding a particular gauge wire towards said cutter;

a movable gate which cooperates with said cam such that when said cam is selectively rotated, said movable gate rides on said cam faces so that said movable gate is correspondingly moved relative to said framework by said cam faces; and a biasing device disposed between said framework and said movable gate for urging said movable gate towards said cam as said movable gate rides on said cam faces.

2. A cable stripper apparatus as set forth in claim 1 wherein said framework includes:

a first member of C-shaped cross sectional configuration, said first member having a first and a second end;

a second member of C-shaped cross sectional configuration, said second member having a first and a second extremity, said first and second members being disposed spaced and parallel relative to each other.

3. A cable stripper apparatus as set forth in claim 2 wherein said first member further includes:

a first bearing disposed between said first and second end of said first member for rotatably supporting said wire feeder;

a second bearing disposed between said first and second extremity of said second member for rotatably supporting said wire feeder so that said wire feeder is rotatably disposed between said first and second bearings.

4. A cable stripper apparatus as set forth in claim 1 further including:

a drive, said drive including:

an electric motor;

a transmission disposed between said motor and said wire feeder so that when said motor is connected to a source of electrical power, said motor rotates said transmission for driving said wire feeder.

5. A cable stripper apparatus as set forth in claim 1 further including:

a drive, said drive including:

a manual drive so that when said manual drive is rotated, such rotation of said manual drive rotates said wire feeder;

a gearbox disposed between said manual drive and said wire feeder, said gearbox transmitting said rotation of said manual drive to said wire feeder.

6. A cable stripper apparatus as set forth in claim 1 wherein said wire feeder includes:

a roller of cylindrical configuration, said roller defining a plurality of teeth for engaging the insulation.

7. A cable stripper apparatus as set forth in claim 6 wherein said plurality of teeth extend in a direction outwardly from an axis of rotation of said roller.

8. A cable stripper apparatus as set forth in claim 7 wherein said direction of said teeth is offset forwardly relative to a radial direction, said offset being forwardly relative to a rotational direction of said roller.

9. A cable stripper apparatus as set forth in claim 1 wherein said wire feeder further includes:

a roller of cylindrical configuration, said roller defining a plurality of teeth for engaging the insulation;

a drive;

a drive shaft disposed coaxially relative to said roller so that said drive shaft is rotatably supported by said framework, said drive shaft being drivingly connected to said drive.

10. A cable stripper apparatus as set forth in claim 1 wherein said guide includes:

abase;

said spacer bar being movable relative to said base, said spacer bar extending towards said wire feeder for guiding the electric cable towards said wire feeder.

11. A cable stripper apparatus as set forth in claim 1 wherein said cutter includes:

a blade disposed adjacent to said wire feeder, said blade being secured adjacent to said guide so that when said wire feeder is being rotated and the cable is guided by said guide towards said blade, the cable is fed between said wire feeder and said blade so that said blade strips the insulation from the cable.

12. A cable stripper apparatus as set forth in claim 1 wherein said cam includes:

a handle for rotating said cam for selecting said required location.

13. A cable stripper apparatus as set forth in claim 1 wherein each cam face of said plurality of cam faces is of planar configuration and spaced circumferentially relative to an adjacent cam face, each cam face being spaced relative to a rotational axis of said cam.

14. A cable stripper apparatus as set forth in claim 13 wherein each cam face is disposed at a different distance from said rotational axis of said cam.

15. A cable stripper apparatus as set forth in claim 1 further including:

a stud slidably extending through said framework, said stud having a first and a second end, said first end of said stud being secured to said movable gate, said second end of said stud being secured to said spacer bar such that when said cam is selectively rotated, a corresponding cam face of said plurality of cam faces moves said movable gate and said stud for moving said spacer bar to said required location of said spacer bar for guiding a particular gauge wire towards said cutter.

16. A cable stripper apparatus for stripping insulation from an electric cable, said apparatus comprising:

a framework;

a driven wire feeder rotatably secured to said framework;

a guide for guiding the cable towards said wire feeder;

said guide including:

a movable spacer bar extending towards said wire feeder;

a cutter having a cutting edge disposed spaced and parallel to an axis of rotation of said wire feeder, said cutter being connected to said framework immediately adjacent to said wire feeder, the arrangement being such that when the cable is guided by said guide towards said wire feeder, said wire feeder, spacer bar and said cutter cooperate with each other for stripping the insulation from the cable;

a cam rotatably supported by said framework for moving said movable spacer bar relative to said framework to a required location of a plurality of locations of said movable spacer bar, said cam defining a plurality of cam faces such that when said cam is selectively rotated, a corresponding cam face of said plurality of cam faces cooperates with and moves said spacer bar to said required location of said spacer bar for guiding a particular gauge wire towards said cutter;

a movable gate which cooperates with said cam such that when said cam is selectively rotated, said movable gate rides on said cam faces so that said movable gate is correspondingly moved relative to said framework by said cam faces;

a biasing device disposed between said framework and said movable gate for urging said movable gate towards said cam as said movable gate rides on said cam faces; and a stud slidably extending through said framework, said stud having a first and a second end, said first end of said stud being secured to said movable gate, said second end of said stud being secured to said spacer bar such that when said cam is selectively rotated, a corresponding cam face of said plurality of cam faces moves said movable gate and said stud for moving said spacer bar to said required location of said spacer bar for guiding a particular gauge wire towards said cutter.

17. A cable stripper apparatus for stripping insulation from an electric cable, said apparatus comprising:

a framework;

a driven wire feeder rotatably secured to said framework;

a guide for guiding the cable towards said wire feeder;

said guide including:

a movable spacer bar extending towards said wire feeder;

a cutter having a cutting edge disposed spaced and parallel to an axis of rotation of said wire feeder, said cutter being connected to said framework immediately adjacent to said wire feeder, the arrangement being such that when the cable is guided by said guide towards said wire feeder, said wire feeder, spacer bar and said cutter cooperate with each other for stripping the insulation from the cable;

a cam rotatably supported by said framework for moving said movable spacer bar relative to said framework to a required location of a plurality of locations of said movable spacer bar, said cam defining a plurality of cam faces such that when said cam is selectively rotated, a corresponding cam face of said plurality of cam faces cooperates with and moves said spacer bar to said required location of said spacer bar for guiding a particular gauge wire towards said cutter;

said framework including:

a first member of C-shaped cross sectional configuration, said first member having a first and a second end;

a second member of C-shaped cross sectional configuration, said second member having a first and a second extremity, said first and second members being disposed spaced and parallel relative to each other;

said first member further including:

a first bearing disposed between said first and second end of said first member for rotatably supporting said wire feeder;

a second bearing disposed between said first and second extremity of said second member for rotatably supporting said wire feeder so that said wire feeder is rotatably disposed between said first and second bearings;

a drive, said drive including:

an electric motor;

a transmission disposed between said motor and said wire feeder so that when said motor is connected to a source of electrical power, said motor rotates said transmission for driving said wire feeder;

said wire feeder including:

a roller of cylindrical configuration, said roller defining a plurality of teeth for engaging the insulation;

said plurality of teeth extend in a direction outwardly from an axis of rotation of said roller;

said direction of said teeth is offset forwardly relative to a radial direction, said offset being forwardly relative to a rotational direction of said roller;

said wire feeder further including:

a drive shaft disposed coaxially relative to said roller so that said drive shaft is rotatably supported by said framework, said drive shaft being drivingly connected to said drive;

said guide includes:

abase;

said spacer bar being movable relative to said base, said spacer bar extending towards said wire feeder for guiding the electric cable towards said wire feeder;

said cutter including:

a blade disposed adjacent to said wire feeder, said blade being secured adjacent to said guide so that when said wire feeder is being rotated and the cable is guided by said guide towards said blade, the cable is fed between said wire feeder and said blade so that said blade strips the insulation from the cable;

said cam including:

a handle for rotating said cam for selecting said required location;

each cam face of said plurality of cam faces is of planar configuration and spaced circumferentially relative to an adjacent cam face, each cam face being spaced relative to a rotational axis of said cam;

each cam face being disposed at a different distance from said rotational axis of said cam;

a movable gate which cooperates with said cam such that when said cam is selectively rotated, said movable gate rides on said cam faces so that said movable gate is correspondingly moved relative to said framework by said cam faces;

a biasing device disposed between said framework and said movable gate for urging said movable gate towards said cam as said movable gate rides on said cam faces; and a stud slidably extending through said framework, said stud having a first and a second end, said first end of said stud being secured to said movable gate, said second end of said stud being secured to said spacer bar such that when said cam is selectively rotated, a corresponding cam face of said plurality of cam faces moves said movable gate and said stud for moving said spacer bar to said required location of said spacer bar for guiding a particular gauge wire towards said cutter.

* * * * *